United States Patent Office 3,110,615
Patented Nov. 12, 1963

3,110,615
URETHANE COATING FOR CORK SURFACE
AND PROCESS THEREFOR
Donald K. Keel, Westfield, N.J., assignor to Congoleum-Nairn Inc., Kearny, N.J., a corporation of New York
No Drawing. Filed Sept. 30, 1957, Ser. No. 686,861
9 Claims. (Cl. 117—118)

This invention relates to resilient surface covering products formed of cork and particularly to a method of coating such products to improve their wearing properties and to the improved cork products so produced.

Cork is widely used in industry because of its properties of resilience and high insulating value. In addition, because of its resistance to penetration of liquids, it is used in the formation of closures of various containers and also finds application in gaskets and similar materials. Cork is a natural occurring product and comes from the bark of the cork oak tree which is grown in commercial quantities in various parts of Portugal, Spain and North Africa. There are also minor commercial stands of the cork oak in North America.

Cork has been widely used in the production of smooth surface coverings for floors, walls and the like in view of the aforementioned desirable properties. It is used as a filler in the manufacture of such products as linoleum and calendered and moulded thermoplastic resinous products. In such products the quantity of cork rarely exceeds 25 percent by weight of the product and the individual cork particles are finely divided (less than 48 mesh) and thus are completely surrounded by the resinous binders used in the composition. The function of the cork in such products is as a resilient filler material, but it is not a major ingredient affecting the wearing properties or decoration of the product. There are, however, certain surface covering products that are formed containing in excess of 30 percent by weight of granular cork and up to 100 percent cork. Such products have exposed cork granules in the surface and are known as cork surface coverings, being conventionally available in rolls or in the form of square or rectangular tiles. Products containing 30 percent cork by weight actually contain about 60 percent cork by volume and thus the wearing properties and decoration of such products is influenced considerably by the properties of the cork.

Cork surface coverings products are characterized by having excellent resilience due to the unique cellular structure of the cork. This same cellular structure imparts excellent heat insulating value to the products so that floors covered with such products tend to be warmer in winter and cooler in summer than floors covered with conventional smooth surface coverings such as linoleum, asphalt tile and the like. Such cork products have several disadvantages, however, which tend to limit their use as floor coverings to areas which are not subject to heavy traffic. The high volume percentage of cork in these products (from about 60 percent to 100 percent) results in the wearing surface of the product being formed predominantly of cork. Cork, in view of its high degree of resilience, is not a hard product, and thus the wearing surface of cork surface coverings tends to become scratched and otherwise worn when walked upon. The surface of cork surface coverings is naturally rough and this roughness furnishes innumerable crevices where dirt particles can cling. Thus, soiling and scratching of cork surface coverings is a serious problem. Also, cork surface coverings, the lighter shades in particular, can become stained and discolored from contact with such normal household materials as shoe polish, iodine, strong cleaning alkalies and the like.

Vinyl resinous compositions and lacquers have been suggested as coatings for cork products in order to overcome these disadvantages. The economics governing the sale of cork surface coverings dictates that only a thin coating can be applied. Otherwise the cost would become too high to permit wide competitive marketing of the product. When thin vinyl or lacquer coatings having a thickness of 5 mils or less are applied to the cork surface covering, the improvement in the product is not substantial. The natural resilience of cork puts severe demands upon a coating system, since the coating must withstand flexing and elongation and possess elasticity. Thin lacquer and vinyl coatings are not satisfactory in these properties. When the product has been worn an amount equivalent to the thickness of the coating applied the resulting worn product is then equivalent in wearing properties to a conventional cork surface covering and thus is subject from then on to all the tendencies of uncoated cork to become scratched, soiled and stained. In addition, the abrasion resulting from foot traffic on a coated cork flooring can result in actual delamination of the coating with the result that areas of the product become unprotected. A relatively thick vinyl layer has been applied to cork tile in such a way that the resulting vinyl film laps over and around the edges of the product. This eliminates the problem of delamination but the resulting product has such a high cost as to eliminate much of the potential market for cork surface coverings.

It is an object of the invention to provide a cork surface covering which is resistant to scratching, soiling and staining for long periods of time even when subjected to heavy wear. A further object of the invention is to provide a coated cork surface covering in which the coating is firmly bonded to the cork so that there is no tendency for the coating to delaminate during wear. A still further object of the invention is to provide a coated cork surface covering which shows continuing improved resistance to scratching, soiling and staining compared to an uncoated product even when the coated product has been worn in excess of the amount corresponding to the thickness of the coating. Other objects and the advantages of the invention will appear hereinafter.

In accordance with the invention a cork surface covering is improved by providing a thin uniform coating of a cured polyurethane on the wearing surface of the product. The coated product so produced has resistance to scratching, soiling and staining for long periods of time even in areas where it is subjected to heavy wear. In addition, even when the coated product has been worn an amount equivalent to the thickness of the coating, the product continues to show improved properties compared to an uncoated cork surface covering.

The surface covering products on which the invention represents a substantial improvement comprise cork in an amount between 30 and 100 percent by weight. Such products are referred to in the specification and the claims as cork surface coverings.

One form of cork surface covering is produced by molding leaves or flakes of natural cork under high pressure and temperature conditions to yield a smooth homogeneous product. Flakes of cork ranging in size up to 1 square inch are molded at high pressures and then the molds are baked for a period of 7 to 10 hours at a temperature between about 450° F. and 600° F. This baking melts the natural resins in the cork and binds the shavings or flakes together into a solid homogeneous mass. Depending on the length of time of the baking process, the color of the moulded cork product can vary from a very light tan to a dark chocolate brown. The product removed from the mould in the form of a slab is normally from 4 to 6 inches thick. This block is skived into slabs which are then sanded to final gauge. The sanded slabs can be cut into conventional square or rectangular tiles or into other appropriate shapes as desired to yield products conventionally referred to as cork tile. The thickness of cork tile ranges from ⅛ inch to 3/16 inch but products as thick as ½ inch can be made for special purposes.

Other forms of cork surface coverings can be produced by blending granulated cork having particles as large as 16 mesh with pigments, fillers and resinous binders, sheeting the mass between calender rolls and thereafter sanding the product to expose the cork granules in the surface. In such products, the mass is held together largely through action of the added resinous binder and adhesion is not dependent on the natural resins present. The cork in such products is present in a volume percentage of 60 percent or higher and is exposed to form a significant part of the decorative effect of the product. The exposed cork particles become soiled and stained when such products are subjected to heavy wear, detrimental effects which are eliminated by the coating system of the invention.

Numerous resinous binders can be used in the production of such cork surface coverings. Thermoplastic resins can be used such as polyvinyl chloride, polyvinyl acetate, vinyl chloride-vinyl acetate copolymer, polyacrylic acid and polyacrylic acid esters, copolymers of the above with each other and other monomers copolymerizable therewith and the like. Useful thermosetting resins include phenolformaldehyde resin, urea-formaldehyde resin, resins obtained by oxidizing and polymerizing natural and synthetic drying oils such as linseed oil, soybean oil, esterified tall oil and the like in the presence of natural and synthetic resins such as rosin, ester gum and the like. Thermoplastic resins of the type disclosed above can be blended with compatible plasticizers such as dioctyl phthalate, dipropylene glycol dibenzoate, didecyl adipate and the like to form thermoplastic resinous binders useful in the formation of cork surface coverings. Where thermosetting resins are used in the production of cork surface coverings, the sheeted product is subjected to heat treatment to cure the resin. A particularly effective resinous binder for cork is obtained by blending partially oxidized drying oils, as disclosed above, with resins to form a binder of the type used in the manufacture of linoleum. The resulting binder is milled with granulated cork and pigments (the cork constituting in excess of 30 percent by weight of the composition), the mass is sheeted and then cured at a temperature of about 140° F. to about 190° F. for from about 3 days to 6 weeks. The resulting product has been widely used as bulletin board material, but can be treated in accordance with the invention to adapt it to service where it is subjected to greater wear, such as a floor covering.

In accordance with the invention cork surface coverings are improved by coating the wearing surface of the product with a thin uniform layer of a polyurethane forming system and thereafter heating the coated product to bring about cure of the coating. Polyurethanes are in the broadest sense polymers produced by polymerizing a polyfunctional isocyanate or thioisocyanate with a material containing 2 or more active hydrogen atoms per molecule. The two reacting substances are mixed and the polymerization reaction is initiated with heat and/or a catalyst. Depending on the molecular structure of the reacting substances and the relative proportions thereof, products having a wide range of properties from hard crystalline to soft rubbery materials can be produced.

In the preparation of urethane polymers for use in the invention, any organic compound having the formula R(N=C=X)$_n$ wherein R is a hydrocarbon group containing 4 to 70 carbon atoms, X is either oxygen or sulfur and $n$ is 2 to 4 can be used as a reactant with the active hydrogen containing molecule. Typical compounds having the formula R(N=C=X)$_n$ which can be used in the invention include hexamethylene diisocyanate and other higher polymethylene diisocyanates and diisothiocyanates, 1,4-cyclohexane diisocyanate, having the formula

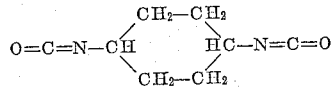

p-isocyanatobenzyl isocyanate, having the formula

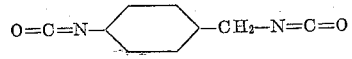

p-phenylene diisothiocyanate, 2,3-dimethyltetramethylene diisocyanate, m-tolylene diisocyanate, naphthalene diisocyanate, diphenyl-4,4'-diisocyanate and the like. Higher molecular weight polyisocyanates and polyisothiocyanates containing up to 70 carbon atoms can be obtained by reacting polyisocyanates with compounds containing active hydrogen atoms. For example, such isocyanates as those enumerated above can be reacted with polyhydric alcohols such as ethylene glycol, diethylene glycol, trimethylol propane and the like with the molecular proportions adjusted that the monomeric reaction product contains free —N=C=X groups. When three mols of tolylene diisocyanate is reacted with one mol of trimethylol propane the resulting product has 3 (—N=C=O) groups per molecule and contains 33 carbon atoms. Thus, the R(N=C=X)$_n$ compound can be a saturated or unsaturated compound and can contain such functional groups as ether, sulfide, ketone, halogen, nitro and the like. Isocyanates and isothiocyanates are highly toxic compounds, so that it is preferred from the standpoint of minimizing toxicity effects in use that R have at least 20 carbon atoms. The lower molecular weight R(N=C=X)$_n$ compounds can be used but special precautions must be taken to protect workers from exposure to the highly toxic vapors. The compound formed by reacting 3 mols of tolylene diisocyanate with 1 mol of trimethylol propane has been found particularly effective in the invention as the R(N=C=X)$_n$ compound.

The material with which the polyisocyanate or polyisothiocyanate reacts to produce a polyurethane is a polyester containing at least 2 active hydrogen atoms per molecule. The flexibility and hardness of the polyurethane are influenced to a large extent by the molecular size and complexity of the polyester used. Long chain polyesters where the active hydrogen atoms are widely separated in the chain are particularly effective. The useful polyesters are formed by reacting polybasic organic acids having from 4 to 40 carbon atoms with polyalcohols containing from 2 to 20 carbon atoms. Suitable polybasic acids include adipic acid, sebacic acid, phthalic acid, isophthalic acid, terephthalic acid, oxalic acid, malonic acid, succinic acid, maleic acid, fumaric acid, cyclohexane dicarboxylic acid, polyacrylic acid, itaconic acid, naphthalene dicarboxylic acid, glutaric acid, citraconic acid, acotinic acid, muconic acid and the like. Dimerized fatty acids such as the dibasic acid formed from 2 molecules of linolenic acid can also be used. Suitable polyalcohols include ethylene glycol, propylene glycol, diethylene glycol, triethylene glycol, trimethylol propane, pentaerythritol, glycerol, sorbitol, triethanolamine, pentaethylene glycol and the like.

Polyesters for use in the invention preferably are those which have a molecular weight in the range from about 500 to about 5,000. In general the higher molecular weight polyesters within this molecular range are particularly effective since they have fewer free —OH groups or active hydrogen atoms per unit of weight which leads to the formation of more flexible coatings when these products are reacted with a R(N=C=X)$_n$ compound. However, the molecular weight should not be so high that the product ceases to be a fluid or at least readily soluble in compatible solvents to produce a fluid coating system.

Although polyesters as described above are preferred for reacting with a $R(N=C=X)_n$ compound in the formation of a polyurethane in accordance with the invention, polyesteramides and polyamides containing active hydrogen atoms can be used in place of a portion of the polyester in the coating formulation. Polyesteramides are formed by reacting polybasic acids as described above with amino-alcohols such as monoethanol amine, 3-aminopropanol, 6-aminohexanol-1, 10-aminodecanol-1, 4-aminobutanol-1 and the like. Polyamides are formed by reacting polybasic acids with polyamines such as ethylene diamine, hexamethylene diamine, 3-methylhexamethylene diamine, decamethylene diamine, m-phenylene diamine and the like. As in the formation of useful polyesters, the molecular proportions of the reactants must be chosen so that the polyesteramide or polyamide has at least 2 active hydrogen atoms per molecule.

A method of correlating the properties of substances which react with $R(N=C=X)_n$ compounds to form a polyurethane is by determination of the isocyanate equivalent. This can be defined as the number of milligrams of —NCO group which can react with 1 gram of the unknown molecule containing active hydrogen atoms. In the determination of isocyanate equivalent of a polyester, a known weight of polyester in solution is reacted with an excess amount of standard phenyl isocyanate and the excess then back-titrated with a standard alcohol. From the relative weights of the known isocyanate and known alcohol, the isocyanate equivalent of the unknown polyester can be determined. In the preparation of coatings for moulded cork products in accordance with the invention, polyesters having an isocyanate equivalent from 25 to 250 are particularly effective. In addition, the polyester should have a low acid number (3 or less) to avoid the possibility of carbon dioxide evolution with resulting foaming of the coating.

The properties of a cured polyurethane coating are influenced not only by the particular reactants used but also by the relative portions of these reactants. Where a weight of $R(N=C=X)_n$ compound exactly equivalent to that of the polyester is used a condition known as 100 percent cross linking is attained in the resulting cured polyurethane. This equivalence of the reactive substances means that there is a —NCX group available to react with every active hydrogen atom in the polyester. Cured polyurethanes with 100 percent cross linking are useful in certain applications but in the preparation of a coating system for use in the invention it is preferred that the proportion of reacting substances be selected so that there is an excess of the $R(N=C=X)_n$ compound. This has been found desirable in the production of coatings which have the optimum degree of adhesion to cork surface coverings. It is preferred in the production of coatings in accordance with the invention that the amount of $R(N=C=X)_n$ compound be from about 125 percent to 300 percent of that theoretically calculated from the isocyanate equivalent of the polyester. An amount of $R(N=C=X)_n$ compound from 140 percent to 250 percent in excess of theoretical is particularly effective.

In the production of a coating system that can be applied by the conventional techniques of coating such as roller coating and doctor knife application the solution should have viscosity range of about 10 to about 10,000 centipoises. A range of from 20 to 150 centipoises is particularly effective for brush and spray application. It has been found that spray application is a particularly effective method of applying a thin uniform coating that will cure to a clear layer free of bubbles or other imperfections. The proper viscosity is obtained in the coating system by controlling the amount of solvent in the coating formulation. Normally in the formulation of the coating the polyester is dissolved in solvent, thoroughly blended and then added to a solution of the poly-NCX compound in a suitable solvent. The choice of the particular solvents used is important in that solvents containing active hydrogen atoms such as alcohols, amines, glycols and the like should be avoided. In addition, it is particularly important that the system be kept free of any water since water readily reacts with an isocyanate with the liberation of carbon dioxide. Any gas evolution would promote undesirable foaming of the coating formulation. Suitable solvents which are compatible with both polyesters and polyisocyanates include ketones, esters and ethers such as acetone, ethyl acetate, methylethylketone, isopropyl acetate, butyl acetate, amyl acetate, isobutyl ketone, butyl propionate, ethylene glycol dimethyl ether, ethylene glycol monomethyl ethyl ether, ethylene glycol monomethyl ether acetate, ethylene glycol monomethyl butyl ester, ethyl lactate and butyl lactate, aromatic solvents can also be used such as benzene, toluene, xylene and the like. In general the coating formulation to have the desired viscosity conditions for satisfactory coating contains from about 20 to about 75 percent solvent by weight.

Small amounts of catalyst can also be present in the coating composition in order to promote cure to the desired polyurethane structure. Such materials as oil soluble metallic compounds such as cobalt and lead naphthenates and the like are suitable catalysts for the polymerization. For certain applications the gloss of a cured polyurethane coating is too great for satisfactory appearance as a floor covering. Gloss can be controlled by the addition of up to 15 percent silica gel in the coating composition. The coating composition can also contain anti-sag agents to promote smoothness of the coating, such as the polyethers, derivatives of cellulose and the like.

Since the reaction between the isocyanate group and an active hydrogen proceeds even at room temperatures, it is preferred that the coating formulation be mixed immediately prior to use. The life of polyurethane coating compositions of the type described ranges up to one day without undue polymerization and resulting viscosity increase. This can be taken care of either by mixing up at one time an amount of coating to be used in one day and then completely using this quantity before additional coating formulation is prepared, or in the case of continuous coating, an amount equivalent to one day's use can be maintained with fresh reactants being added to make up for the material withdrawn.

The quantity of coating formulation applied to the surface of the cork surface covering can vary depending on the amount of wear to which the coated product is to be subjected after installation. In general, an amount equivalent to a thickness of 1 mil is the minimum practical amount that can be satisfactorily applied by the conventional techniques of coating. An amount equivalent to a thickness of 5 mils will impart satisfactory wear resisting properties to cork surface coverings installed in areas subject to heavy foot traffic. A range of 2 to 3 mils has been found particularly effective.

After the coating has been applied to the cork surface covering it is subjected to heat treatment in order to produce a cured polyurethane coating. The heat treatment is conventionally carried out in two stages. First, there is a drying step for removal of the major portion of the solvents used in the coating formulation. This drying can be effected by merely exposing the coated cork surface covering to the air or mild heat can be applied. Exposure of the coated cork surface covering to normal atmospheric temperatures for about 5 to 10 minutes will normally bring about satisfactory removal of solvents. The cork surface covering with dried coating on one surface thereof is then subjected to heat treatment in order to cure the polyurethane. The length of time is dependent in large measure on the temperature used with longer time being required for lower temperature heat treatment. Satisfactory cure of a polyurethane coating can be effected by heat treatment for two hours at about 175° F. or about 15 minutes or less at about 350° F. The heat treatment can be carried out in a conventional forced hot air oven or radiant heating lamps can be used. After the coating has been cured the product is allowed to cool and is then ready for use, after an aging period. Maintaining the product exposed to the air for a week after oven cure is desirable in obtaining a coating with optimum properties. Additional cross-linking, promoted by traces of moisture in the air can occur. Where large cork slabs have been coated and the coating cured the resulting product can be cut into square or rectangular tiles of the size normally sold as cork tile.

The following example is given for purposes of illustrating the invention and demonstrating the advantages of products produced in accordance with the invention over those of the prior art:

EXAMPLE

A fluid coating material having the following formulation was prepared:

| | Percent by weight |
|---|---|
| Long chain polyester [1] (isocyanate equivalent [3] = 173) | 14.4 |
| Long chain polyester [2] (isocyanate equivalent=33) | 14.4 |
| Cellulose acetate butyrate (10% solution ethyl acetate) | 5.8 |
| Polyisocyanate compound [4] | 23.0 |
| Silica aerogel | 4.3 |
| Ethyl acetate | 7.6 |
| Butyl acetate | 7.6 |
| Toluene | 7.6 |
| Methyl Cellosolve acetate | 15.3 |
| | 100.0 |

[1] Multron R-12, Mobay Chemical Co. St. Louis, Mo.
[2] Multron R-16, Mobay Chemical Co. St. Louis, Mo.
[3] Isocyanate equivalent defined as the number of milligrams of —NCO group equivalent to the active hydrogen atoms in 1 gram of the polyester.
[4] Polyisocyanate prepared by reacting 3 mols of tolylene diisocyanate with 1 mol of trimethylol propane. The resulting compound contains 3 free —NCO groups per molecule and has a molecular weight of 656.

In the preparation of the coating, the polyesters were blended with solvents and flatting agent and then added to a 75 percent by weight solution of the polyisocyanate in methyl Cellosolve acetate. The resulting coating had a viscosity of 50 centipoises and contained 56.6 percent non-volatile material. The coating formulation contained 150 percent of the theoretical amount of polyisocyanate required to react with the polyesters.

Cork shavings were packed in a mould and pressed for 8 hours at a temperature of 500° F. to yield a molded cork block 5 inches in thickness and 36 inches square. The block was skived with a continuous band knife into 36 inch square slabs which were sanded to ⅛ inch gauge. To the surface of the cork slabs was sprayed a film of the coating material in an amount corresponding to a cured coating thickness of 2 mils. The coated cork slab was air dried for 10 minutes to permit preliminary evaporation of solvent and then cured in an oven at 275° F. for 30 minutes, thus yielding a cork slab bearing a tough flexible coating of cured polyurethane. This coated and oven cured slab was aged in air for 1 week and then cut into individual 9 by 9 inch tiles in conventional die cutting equipment.

Cork surface coverings made by moulding 100 percent cork of the type coated as shown in the example were installed in an area where they were subjected to heavy foot traffic for a period of six months. The coated cork products showed substantially no wear and exhibited no soiling or scratching tendencies over this period of time. Conventional cork tile laid in an adjacent area and subjected to the same area became heavily soiled and scratched during the test period.

Polyurethane coatings are known to have excellent abrasion resistance and have been suggested for use on conventional smooth surface floor and wall coverings such as linoleum, asphalt tile and vinyl floors. When thin polyurethane coatings are applied to such conventional smooth surface flooring products, it is found that the abrasion resistance of the coated product is not substantially better than that of an uncoated product. The following table illustrates the results attained when coated and uncoated smooth surface flooring products are subjected to abrasion testing on a conventional continuous sandpaper abrader. In each test the sandpaper abrader was operated for 70 revolutions and the resulting difference in gauge of the product before and after the test was measured and expressed in mils (thousandths of an inch):

Table I

| Type of Flooring | Mils Lost—Control | Mils Lost—Coated Sample [1] |
|---|---|---|
| Asphalt tile | 7 | 6 |
| Linoleum | 10 | 9.7 |
| Calendered | | |
| Vinyl Flooring | 4 | 4 |
| Cork tile | 17 | 8 |

[1] Coating thickness equals 2 mils.

The results in Table I indicate the remarkable improvement realized when a thin polyurethane coating is applied to cork tile as compared to the small or non-existent improvement when the polyurethane is applied to other floorings. In the case of vinyl flooring, linoleum and asphalt tile the difference between wear of the control and wear of the sample ranged from 0 to 1 mil, whereas in the case of cork tile the improvement was 9 mils.

The reason for this remarkable improvement is not completely known but it is believed that the presence of excess isocyanate groups in the polyurethane coating system affords sites for chemical bonding with free active hydrogen atoms present in the cork. Cork is known to be composed of cellulose and various complex fatty acids and their derivatives. Should chemical bonding of this type occur it would explain the remarkable adhesion of the coating to the cork surface covering. In the case of asphalt tile, linoleum and vinyl flooring, no such opportunity for chemical bonding exists so that failure of the coated products to exhibit substantial improvement over uncoated products when subjected to abrasion could be due to the failure of the coating to adhere to the product.

A moulded cork surface covering bearing a coating of the type described in the example was also compared with cork products bearing coatings of other materials frequently used in the coating field. In each case, an amount of coating equivalent to a thickness of 2 mils was applied. These other materials were, first, a conventional nitrocellulose base lacquer and, second, a polyvinyl chloride coating. The results of abrasion tests on these products expressed as mils thickness lost at different times in the abrasion testing cycle are tabulated below:

Table II

| Type of Coating | Mils Lost at 15 Revolutions | Mils Lost at 25 Revolutions | Mils Lost at 50 Revolutions |
|---|---|---|---|
| Control (uncoated) | 3 | 6 | 13 |
| Polyurethane | 1 | 2 | 4 |
| Vinyl Chloride | 1 | 2 | 8 |
| Lacquer (nitrocellulose) | 2 | 4 | 10 |

The results shown in Table II indicate two significant results. First, comparing the abrasion at 50 revolutions for the different types of coating it is clear that the polyurethane coating is far superior to either the conventional lacquer and vinyl coatings which have been used on cork in the past. However, the most significant result demonstrated in Table II is the remarkable resistance to abrasion of polyurethane coated cork even after a thickness corresponding to that of the original coating has been worn away. It can be seen in Table II that after 25 revolutions of the abrasion testing machine both the vinyl coated and the polyurethane coated tiles had worn the same amount, namely 2 mils. Further abrasion of the vinyl coated cork tile indicated 6 mils additional loss between 25 and 50 revolutions or almost equal to the 7 mils loss of the control sample at the same point in the test. However, in the case of the polyurethane coated tile only 2 mils was lost in going from 25 to 50 revolutions of the testing machine. This indicates that even though an amount equivalent to the thickness of the original coating had been worn from the product during the first 25 revolutions of the abrasion tester, equal resistance to abrasion was attained during the succeeding 25 revolutions.

The reason for this remarkable and unexpected result is not fully understood but it may again be related to the chemical bonding of the polyurethane coating to the cork. Natural cork has a unique cellular structure wherein the individual air filled cells are in closely spaced relation one to another with tiny hair-like capillaries in between. It is possible that migration of the coating within these hair-like capillaries between the individual cells coupled with chemical bonding of the coating to the cork permits the individual cells to be surrounded by a tough polyurethane coating. This migration of the coating into the structure of the cork coupled with chemical bonding could explain the remarkable resistance to abrasion shown by polyurethane coated products even after a thickness equivalent to that of the original coating has been worn away.

The above comparisons were made using a cork surface covering obtained by moulding 100 percent cork. However, cork surface coverings which comprise 30 percent by weight of granular cork in the presence of pigments, fillers and resinous binders and which have exposed cork granules in the surface have been coated with a thin layer of polyurethane in accordance with the invention. When these products are installed in a test area along side of similar uncoated products the same remarkable resistance to abrasion, soiling and scratching exhibited by coated cork tile is observed.

Any departure from the foregoing description which conforms to the invention is intended to be included within the scope of the claims.

I claim:

1. A decorative cork surface covering for floors, walls and the like having improved resistance to abrasion, scratching, soiling and staining which comprises a smooth compact sheet having from 30 percent to 100 percent by weight of cork exposed in its upper surface and a uniform coating over said upper surface of about 1 to about 5 mils in thickness of a cured polyurethane coating composition comprising a reaction product of an organic polyester and an organic polyisocyanate, said polyisocyanate being present in an amount in excess of the theoretical isocyanate equivalent of said polyester.

2. A decorative cork surface covering for floors, walls and the like having improved resistance to abrasion, scratching, soiling and staining which comprises a smooth compact sheet having from 30 percent to 100 percent by weight of cork exposed in its upper surface and a uniform coating over said upper surface of about 1 to about 5 mils in thickness of a cured polyurethane coating composition comprising a reaction product of a polyisocyanate compound having the formula $R(N=C=X)_n$ wherein R is a hydrocarbon group containing from 4 to 70 carbon atoms, X is selected from the group consisting of oxygen and sulfur and $n$ is 2 to 4 and a long carbon chain polyester containing at least 2 active hydrogen atoms per molecule and having a molecular weight of about 500 to about 5,000 and an isocyanate equivalent of from 25 to 250, said polyisocyanate compound being present in an amount in excess of the theoretical isocyanate equivalent of said polyester.

3. The decorative cork surface covering according to claim 2 wherein said polyester is a reaction product of a polybasic acid containing from 4 to 40 carbon atoms and a polyalcohol containing from 2 to 20 carbon atoms.

4. The decorative cork surface covering according to claim 2 wherein X is oxygen and R is a hydrocarbon group containing from 20 to 70 carbon atoms.

5. The decorative cork surface covering according to claim 4 wherein said $R(N=C=X)_n$ compound is a polyisocyanate obtained by reacting three mols of tolylene diisocyanate with one mol of trimethylolpropane.

6. A method of improving the abrasion, scratch, soil and stain resistance of a cork surface covering containing from 30 to 100 percent by weight of cork exposed in its wear surface which comprises coating said wear surface with an uncured polyurethane coating composition comprising a mixture of an organic polyester and an excess of organic polyisocyanate over the theoretical isocyanate equivalent of said polyester, heating said coated cork surface covering to yield a cured polyurethane coating having a thickness of about 1 to about 5 mils and cooling said cured coating.

7. A method of improving the abrasion, scratch, soil and stain resistance of a cork surface covering containing from 30 to 100 percent by weight of cork exposed in its wear surface which comprises coating said wear surface with an uncured fluid coating composition comprising a mixture of a polyisocyanate compound having the formula $R(N=C=X)_n$ wherein R is a hydrocarbon group containing from 4 to 70 carbon atoms, X is selected from the group consisting of oxygen and sulfur and $n$ is 2 to 4, and a long carbon chain polyester composition containing at least two active hydrogen atoms per molecule having a molecular weight from about 500 to about 5,000 and an isocyanate equivalent of 25 to 250, said polyisocyanate compound being present in an amount in excess of the theoretical isocyanate equivalent of said polyester, heating said coated cork surface covering to yield a cured polyurethane coating of about 1 to about 5 mils in thickness and cooling said cured coating.

8. The method according to claim 7 wherein said $R(N=C=X)_n$ compound is a polyisocyanate obtained by reacting three mols of tolylene diisocyanate with one mol of trimethylolpropane.

9. The method according to claim 8 wherein said polyester is formed by reacting a polybasic acid containing from 4 to 40 carbon atoms with a polyalcohol containing from 2 to 20 carbon atoms.

References Cited in the file of this patent

UNITED STATES PATENTS

| | | |
|---|---|---|
| 2,277,083 | Dorough | Mar. 24, 1942 |
| 2,625,532 | Seeger | Jan. 13, 1953 |
| 2,832,104 | Maryanski | Apr. 29, 1958 |
| 2,852,412 | Hassel | Sept. 16, 1958 |
| 2,924,587 | Shorr | Feb. 9, 1960 |

FOREIGN PATENTS

| | | |
|---|---|---|
| 745,960 | Great Britain | Mar. 7, 1956 |
| 149,423 | Australia | Dec. 15, 1952 |
| 644,829 | Great Britain | Oct. 18, 1950 |